Nov. 19, 1963  K. C. FISCHER  3,110,932
INJECTION MOLDING APPARATUS
Filed July 9, 1962  2 Sheets-Sheet 1

INVENTOR.
Kenneth C. Fischer
BY
AGENT

Nov. 19, 1963 K. C. FISCHER 3,110,932
INJECTION MOLDING APPARATUS
Filed July 9, 1962 2 Sheets-Sheet 2

INVENTOR.
Kenneth C. Fischer
BY
AGENT

United States Patent Office 3,110,932
Patented Nov. 19, 1963

3,110,932
INJECTION MOLDING APPARATUS
Kenneth C. Fischer, Midland, Mich., assignor to The Dow Chemical Company, Midland, Mich., a corporation of Delaware
Filed July 9, 1962, Ser. No. 208,376
11 Claims. (Cl. 18—30)

This invention relates to an improved apparatus for injection molding. It more particularly relates to certain improvements in the form of a heat exchange spreader or torpedo.

In injection molding apparatus it has long been a problem to provide adequate heat exchange within the heating cylinder of an injection molding machine to provide a heat plastified material of uniform temperature. There have been many attempts to design spreaders or torpedoes for injection molding machines which provide adequate heat exchange by means of complicated and devious flow patterns. Many torpedoes are provided with internal heating means in an attempt to provide uniform heating of the polymeric material. As a result, relatively long heating cylinders are required to house the torpedoes and due to the length and complicated passageways therein, frequently unnecessary internal pressure drop occurs within the cylinder across the torpedo rather than across the injection nozzle. Such designs often cause polymeric material to "hang up" or be retained within the cylinder and torpedo for extended periods of time and subject small quantities of polymer to high temperatures for extended periods of time causing undesired decomposition thereof.

It is an object of this invention to provide an improved torpedo for an injection molding machine.

It is a further object of this invention to provide an improved torpedo of small physical dimension and having a relatively large heat exchange surface.

It is another object of this invention to provide an injection molding machine having disposed within its heated cylinder a heat exchange torpedo which provides a relatively streamline flow pattern.

These objects and other advantages and benefits are provided in an injection molding machine by providing a heat exchange torpedo rigidly positioned within the heating cylinder, said torpedo comprising a body having a first end and a second end and means to support said torpedo within said cylinder, means to provide heat within said body, said first end of said body having a generally tapered configuration, said second end of said body defining a plurality of generally parallel slot-like passageways and a centrally disposed aperture, said slot-like passageways being in communication with said centrally disposed aperture and with the external surface of said body and said heat exchange means being in operative combination with at least the portion of said body defining said slot-like passageways.

These features and other advantages of the present invention will become more apparent when the specification is taken in conjunction with the drawing wherein.

Figure 1:
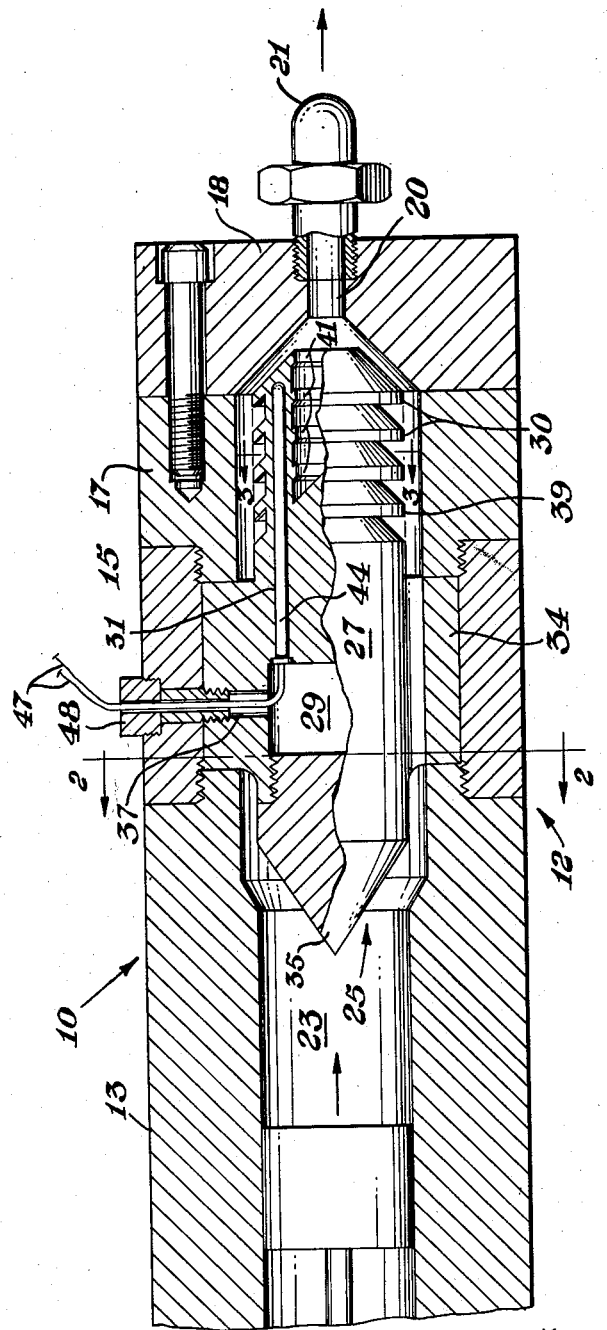
FIGURE 1 is a sectional representation of a portion of an injection molding machine depicting the cylinder and heat exchange torpedo.
Figure 2:
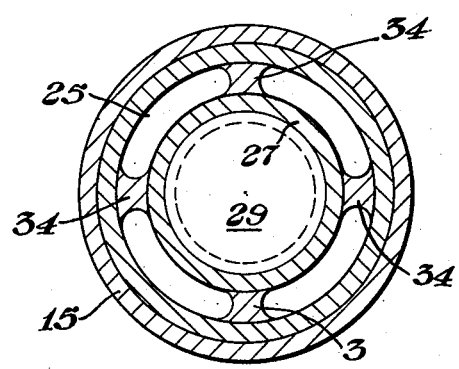
FIGURE 2 is a cross section of the torpedo of FIGURE 1 taken along the line 2—2.
Figure 3:
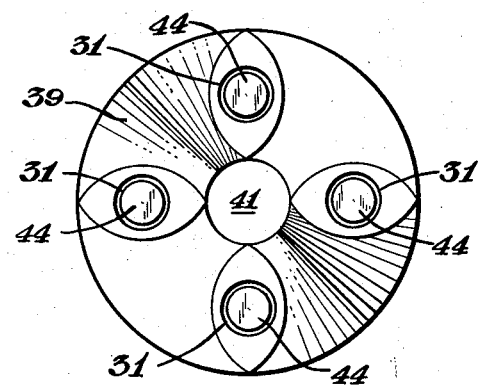
FIGURE 3 is a sectional view of the torpedo of FIGURE 1 taken along the line 3—3.

In FIGURE 1 there is shown a cross sectional representation of a heating cylinder portion of an injection molding machine generally designated by the reference numeral 10. The injection molding apparatus 10 comprises a heating cylinder 12 which consists of a major body portion 13, torpedo support section 15, a terminal portion 17 and a cap 18. The cap 18 is provided with an internal passageway 20 and an injection nozzle 21. The cylinder 12 defines an internal passageway 23 within which is disposed a torpedo generally designated by the reference numeral 25.

With reference to FIGURES 1, 2, 3 and 4, the torpedo 25 comprises a body portion 27. The body portion 27 defines an internal cavity 29 and passageways 31 which are in communication with a cavity 29. Integral with the body portion 27 are support webs or spider arms 34 which support the torpedo centrally within the heating cylinder. A tapered upstream end portion 35 further serves to define the cavity 29. A passageway 37 is provided in at least one of the spider arms 34 to provide means of access to the cavity 29 and the passageways 31 within the torpedo. Remotely disposed from the upstream end 35 there is provided a plurality of generally conical plates 39 each defining a centrally disposed aperture 41. The generally conical plates 39 are maintained in relationship by the portion of the body 27 defining the passageway 31 and extending into and through the plates 39. The plates 39 are secured to the body 37 in a manner suitable to provide good thermal conduction between the body and the heat exchange plates. Disposed within the passageway 31 are cartridge heaters 44. The electrical leads 47 of the cartridge heaters 44 are in communication with a power source not shown by means of the passageway 37 which receives the bushing 48.

Figure 5:
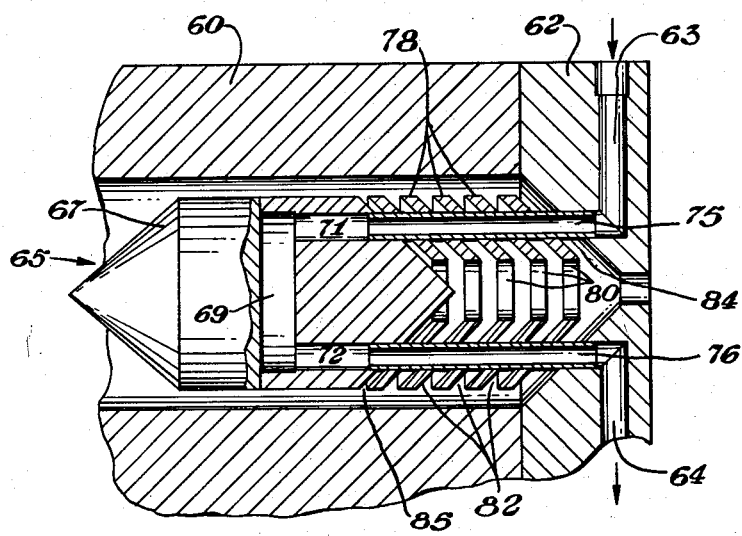
FIGURE 5 is a cross sectional representation of an alternate embodiment of the invention.
Figure 4:
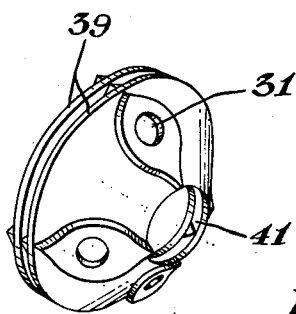
FIGURE 4 is an isometric view of two of the generally conical heat exchange plates of the torpedo of FIGURE 1.

In FIGURE 5 there is illustrated a sectional view of the alternate embodiment of the invention wherein a heating cylinder 60 is provided with a terminal or end cap 62. The end cap 62 defines an inlet passageway 63 and outlet passageway 64. The inlet and outlet passageways 63 and 64 are in operative communication with a torpedo generally designated by the reference numeral 65 centrally located within the heating cylinder 60. The torpedo 65 comprises a body portion 67. The body portion 67 defines an internal chamber 69 which is in communication with an inlet passageway 71 and outlet passageway 72. A conduit 75 provides communication between the passageway 71 and the passageway 63 of the cylinder end 62. A conduit 76 provides communication between the outlet port 64 of the cylinder end 62 and passageway 72 of the torpedo body 67. The conduits 75 and 76 provide rigid support for the torpedo body 67 and provides a means of circulating a heat exchange fluid within the torpedo body. A plurality of generally conical plates 78 are carried on the conduits 75 and 76. The plates 78 are provided with central openings 80 and are maintained in spaced relationship to each other. Between each of the plates 78 is defined a generally annular passageway 82. The plate 78 and the body 67 define a generally annular passageway 83 similar to the passageway 82. Another generlly annular passageway 84 is defined by the plate 78 adjacent the cylinder end 62.

Operation of the present invention is readily understood by reference to FIGURES 1, 2, 3 and 4. The flow path of the polymeric material within the heating cylinder is depicted by the arrows. Heat plastified polymeric material disposed toward the end 35 of the torpedo 25 are forced by the piston around the body 27 between the spider arms 34 and into the generally annular space surrounding the concial plates 39. The molten polymeric material is then forced between the plates 39 and over the outside of the conduit 31 and is recombined in the space generally defined by the apertures 41. Material is then forced out through the passageway 20 and out of the injection nozzle 21 and into the mold chamber not shown. Thus, the molten polymer in traveling past the torpedo contacts a relatively short distance traversed. This serves to provide a very evenly heated polymer which flows readily into the mold.

The configuration of the present torpedo requires the division of the molten polymer into a plurality of thin layers, each of the layers contacting one or more heat exchange surfaces. This is particularly advantageous, as polymeric materials have a relatively low heat transfer coefficient and the increased surface and decreased thickness of the flow path provided rapid heat exchange. The generally annular passageways within the torpedo provide a substantial increase in the heat exchange surface per unit length of the torpedo and result in either increased heat exchange surface per unit length or for equal heat exchange surface permit the use of a shorter heating cylinder than with known torpedoes. Typically the torpedoes in accordance with the invention are only about one-half the length of known torpedoes to provide equivalent heat exchange.

The embodiment depicted in FIGURES 1, 2, 3 and 4 is particularly adapted for use in production injection molding wherein electric heating of the torpedo is beneficially employed whereas the embodiment of FIGURE 5 is particularly suited for extremely close temperature control for experimental installations and the molding of complicated articles where precise temperature control is necessary. The heat exchange fluid generally will respond more rapidly to control than will electric heating.

Torpedoes in accordance with the invention beneficially are prepared from heat conductive metals suitable for the type of thermoplastic polymeric material with which they are to be employed. Beneficially they are assembled from a number of smaller parts, the body portion being built up from an end plug, a hollow central portion providing a chamber within which electric leads or heat exchange fluid is to be circulated. The webs to support the heat exchange plates may be inserted into suitable openings in the body portions and the heat exchange plates placed over the webs and the entire assembly when in proper configuration may be oven brazed to give a unitary structure and a good strength and maximum heat conductivity between the various portions.

Frequently it is beneficial to fabricate the plates by means of a pump press and the like and assemble them prior to brazing by utilizing spacers having a generally streamline configuration to maintain a fixed distance between the adjacent plates.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A heat exchange torpedo comprising a body having an upstream end and a downstream end and means to support said torpedo within a heating cylinder, means to provide heat within said body, said first end of said body having a generally tapered configuration, said second end of said body defining a centrally disposed aperture, a plurality of generally parallel slot-like passageways providing communication between said aperture and the extended surface of said body and heat supply means in operative combination with at least the portion of said body defining said passageways.

2. A heat exchange torpedo for an injection molding machine comprising a generally cylindrical body portion having a first end and a second end, means to support said torpedo within said cylinder, means to provide heat within said body, said first end of said body having a generally tapered configuration, said second end of said body comprising a plurality of generally parallel plates, each of said plates defining a centrally disposed aperture, said plates being arranged in generally parallel relationship to each other and disposed generally coaxially with said body, each of said plates being maintained in spaced relationship to each other by means of at least one web, said web being affixed to the second end of said body and having within said web heat supply means, said conical plates in spaced relationship defining a plurality of slot-like communication passageways extending from the centrally positioned aperture in said plates to the periphery of said plates and interrupted only by said supporting means.

3. The torpedo of claim 2, wherein said plates are of generally conical configuration.

4. The torpedo of claim 3, wherein said plates are generally concave toward said second end of said body.

5. The torpedo of claim 2, including electric heaters disposed within said webs.

6. The torpedo of claim 2, wherein said webs define passageways for the circulation of a heat exchange liquid.

7. In an injection molding machine having a heating cylinder and a heat exchange torpedo rigidly positioned within said cylinder, the improvement which comprises a torpedo comprising a generally cylindrical body portion having a first end and a second end, means to support said torpedo within said cylinder, means to provide heat within said body, said first end of said body having a generally tapered configuration, said second end of said body comprising a plurality of generally parallel plates, each of said plates defining a centrally disposed aperture, said plates being arranged in generally parallel relationship to each other and disposed generally coaxially with said body, each of said plates being maintained in spaced relationship to each other by means of at least one web, said web being affixed to the second end of said body and having within said web heat supply means, said conical plates in spaced relationship defining a plurality of slot-like communication passageways extending from the centrally positioned aperture in said plates to the periphery of said plates and interrupted only by said supporting webs.

8. The injection molding machine of claim 7, wherein said plates are of generally conical configuration.

9. The injection molding machine of claim 8, where said plates are generally concave toward said second end of said body.

10. The injection molding machine of claim 7, including electric heaters disposed within said webs.

11. The injection molding machine of claim 7, wherein said webs define passageways for the circulation of a heat exchange liquid.

References Cited in the file of this patent

UNITED STATES PATENTS

| | | |
|---|---|---|
| 2,354,363 | Burry | July 25, 1944 |
| 2,367,144 | Shaver | Jan. 9, 1945 |
| 2,443,594 | Boettler et al. | June 22, 1948 |
| 2,696,641 | Schwartz | Dec. 14, 1954 |

FOREIGN PATENTS

| | | |
|---|---|---|
| 1,081,640 | France | June 9, 1954 |
| 1,180,857 | France | Jan. 5, 1959 |
| 597,997 | Great Britain | Feb. 9, 1948 |